United States Patent
Li (10) Patent No.: US 10,609,607 B2
(45) Date of Patent: Mar. 31, 2020

(54) ENHANCED REPORTING FOR HANDOVER IN DEVICE-TO-DEVICE COMMUNICATION

(71) Applicant: Microsoft Technology Licensing, LLC

(72) Inventor: Haitao Li, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/867,521

(22) Filed: Jan. 10, 2018

(65) Prior Publication Data

US 2018/0132144 A1 May 10, 2018

Related U.S. Application Data

(63) Continuation of application No. 14/503,369, filed on Sep. 30, 2014, now Pat. No. 9,883,426.

(30) Foreign Application Priority Data

Jul. 31, 2014 (CN) .......................... 2014 1 0370839

(51) Int. Cl.
  *H04W 36/00* (2009.01)
  *H04W 76/23* (2018.01)
  *H04W 76/15* (2018.01)

(52) U.S. Cl.
  CPC ... *H04W 36/0061* (2013.01); *H04W 36/0016* (2013.01); *H04W 76/23* (2018.02); *H04W 36/03* (2018.08); *H04W 76/15* (2018.02)

(58) Field of Classification Search
  CPC ............. H04W 76/15; H04W 36/0016; H04W 36/0061

USPC ................ 455/436–439, 442–444, 452.2; 370/331–332

See application file for complete search history.

(56) References Cited

U.S. PATENT DOCUMENTS

| 8,504,052 B2 | 8/2013 | Hakola et al. |
| 8,787,305 B2 | 7/2014 | Michels et al. |
| 2011/0176509 A1 | 7/2011 | Hole et al. |

(Continued)

FOREIGN PATENT DOCUMENTS

| CN | 103781017 A | 5/2014 |
| WO | 2011109027 A1 | 9/2011 |

(Continued)

OTHER PUBLICATIONS

"Final Office Action Issued in U.S. Appl. No. 14/503,369", dated Nov. 1, 2016, 5 Pages.
"Non Final Office Action Issued in U.S. Appl. No. 14/503,369", dated Jun. 13, 2016, 9 Pages.

(Continued)

*Primary Examiner* — Congvan Tran
(74) *Attorney, Agent, or Firm* — Ray Quinney & Nebeker, P.C.; Thomas M. Hardman; Matthew M. Walker (57) ABSTRACT

A method, user equipment and a base station for handover in device-to-device communication are disclosed. To maintain continuity of the ongoing device-to-device communication after the handover, an enhanced reporting mechanism is introduced such that the user equipment with the ongoing device-to-device communication would be handed over to a cell of a neighbor base station that supports the device-to-device communication. In this manner, the device-to-device communication continuity may be maintained.

15 Claims, 5 Drawing Sheets

(56) References Cited

U.S. PATENT DOCUMENTS

| | | | |
|---|---|---|---|
| 2013/0102314 A1* | 4/2013 | Koskela | H04W 36/0072 |
| | | | 455/436 |
| 2013/0288608 A1 | 10/2013 | Fwu et al. | |
| 2013/0324114 A1 | 12/2013 | Raghothaman et al. | |
| 2014/0135019 A1 | 5/2014 | Jang et al. | |
| 2014/0314049 A1* | 10/2014 | Cho | H04L 5/006 |
| | | | 370/332 |
| 2015/0004984 A1 | 1/2015 | Kim et al. | |
| 2015/0105084 A1* | 4/2015 | Bontu | H04W 36/0072 |
| | | | 455/437 |
| 2015/0163705 A1* | 6/2015 | Lu | H04W 36/0055 |
| | | | 370/331 |
| 2015/0195865 A1* | 7/2015 | Lee | H04W 76/14 |
| | | | 455/426.1 |
| 2015/0208452 A1 | 7/2015 | Lee et al. | |
| 2015/0230114 A1 | 8/2015 | Delsol et al. | |
| 2015/0271733 A1* | 9/2015 | Li | H04W 24/02 |
| | | | 455/445 |
| 2015/0288724 A1* | 10/2015 | Fransen | H04W 76/14 |
| | | | 455/414.1 |
| 2015/0304911 A1 | 10/2015 | Wang et al. | |
| 2015/0312775 A1 | 10/2015 | Yi et al. | |
| 2015/0312836 A1* | 10/2015 | Fukuta | H04W 36/08 |
| | | | 455/438 |
| 2016/0021594 A1* | 1/2016 | Yilmaz | H04W 36/30 |
| | | | 370/332 |

FOREIGN PATENT DOCUMENTS

| | | |
|---|---|---|
| WO | 2013055271 A1 | 4/2013 |
| WO | 2013109040 A1 | 7/2013 |
| WO | 2014081354 A1 | 5/2014 |
| WO | 2014089094 A1 | 6/2014 |

OTHER PUBLICATIONS

"Non Final Office Action Issued in U.S. Appl. No. 14/503,369", dated Apr. 26, 2017, 8 Pages.

"Notice of Allowance Issued in U.S. Appl. No. 14/503,369", dated Sep. 25, 2017, 5 Pages.

"International Preliminary Report on Patentability Issued in PCT Application No. PCT/US2015/042823", dated Oct. 14, 2016, 9 Pages.

"International Search Report and Written Opinion Issued in PCT Application No. PCT/US2015/042823", dated Oct. 16, 2015, 11 Pages.

"Second Written Opinion Issued in PCT Application No. PCT/US2015/042823", dated Jun. 9, 2016, 7 Pages.

Tsolkas, et al., "LTE-A Access, Core, and Protocol Architecture for D2D Communication", In Book Smart Device to Smart Device Communication, Published by: Springer International Publishing, Apr. 2014, pp. 23-40.

"First Office Action Issued in Chinese Patent Application No. 201580040388.0", dated Oct. 22, 2019, 9 Pages.

* cited by examiner

ENHANCED REPORTING FOR HANDOVER IN DEVICE-TO-DEVICE COMMUNICATION

RELATED APPLICATIONS

This application is a continuation of, and takes benefit of, U.S. patent application Ser. No. 14/503,369, filed on Sep. 30, 2014 and titled "ENHANCED REPORTING FOR HANDOVER IN DEVICE-TO-DEVICE COMMUNICATION", which is hereby incorporated in its entirety by reference.

FIELD

Example embodiments of the present disclosure generally relate to wireless communication techniques.

BACKGROUND

Compared to legacy cellular communication which takes place between User Equipment ("UE") and networks, Device-to-Device ("D2D") communication, which is also referred to as Proximity-based Service ("ProSe") communication, enables direct link communication between UEs and thus achieves the potential benefits of UE power saving due to short transmission distances, efficient radio resource reuse and offloading network's burden. The existing third Generation Partnership Project ("3GPP") Long Term Evolution ("LTE") network has well-defined mechanisms for maintaining Evolved Packet System ("EPS") services. When the 3GPP considers integrating D2D features into the LTE network, how to maintain D2D service continuity under continuous network management and control becomes challenging from the perspectives of both end users and operators.

SUMMARY

This summary presents a simplified disclosure in order to provide a basic understanding of embodiments of the claimed subject matter to the reader. This summary is not an extensive overview of the disclosure and provides an introduction to a selection of concepts in a simplified form that are further described below in the Detailed Description. This summary is not intended to identify key or critical features or essential features of the claimed subject matter, nor is it intended to be used as an aid in determining the scope of the claimed subject matter. Its sole purpose is to present some concepts disclosed herein in a simplified form as a prelude to the more detailed description that is presented later.

According to an aspect of the present disclosure, there is provided a method for performing a handover in device-to-device communication. The method comprises receiving, at a serving base station, a device-to-device support status report from at least one user equipment with ongoing device-to-device communication or from at least one neighbor base station, wherein the device-to-device support status report indicates support status of each of one or more cells of the at least one neighbor base station with respect to the device-to-device communication. The method also comprises determining, based on the device-to-device support status report and a measurement report received from the at least one user equipment, one or more candidate cells that support the device-to-device communication from the one or more cells of the at least one neighbor base station. The method further comprises transmitting, one or more handover requests respectively corresponding to the one or more candidate cells, to the at least one neighbor base station for the handover of the at least one user equipment to one of the one or more candidate cells.

According to another aspect of the present disclosure, there is provided a method for performing a handover in device-to-device communication. The method comprises transmitting a measurement report to a serving base station, wherein the measurement report indicates one or more cells of at least one neighbor base station. The method also comprises receiving a request for a device-to-device support status report from the serving base station. The method further comprises, responsive to the request, generating the device-to-device support status report based on a proximity service based system information block broadcasted from the at least one neighbor base station, wherein the proximity service based system information block includes a bit field indicative of the support status of each cell of the one or more cells with respect to the device-to-device communication or includes information regarding resource pools for the device-to-device communication within each cell. The method additionally comprises transmitting the device-to-device support status to the serving base station, wherein the device-to-device support status report indicates support status of each of the one or more cells of the at least one neighbor base station with respect to the device-to-device communication.

According to another aspect of the present disclosure, there is provided user equipment. The user equipment comprises a transmitter configured to transmit a measurement report to a serving base station, wherein the measurement report indicates one or more cells of at least one neighbor base station. The user equipment also comprises a receiver configured to receive a request for a device-to-device support status report from the serving base station. The transmitter is further configured to, in response to the request, transmit the device-to-device support status to the serving base station, wherein the device-to-device support status report indicates support status of each of the one or more cells of the at least one neighbor base station with respect to the device-to-device communication.

According to yet another aspect of the present disclosure, there is provided a base station. The base station comprises a receiver configured to receive a device-to-device support status report from at least one user equipment with ongoing device-to-device communication or from at least one neighbor base station, wherein the device-to-device support status report indicates support status of each of one or more cells of the at least one neighbor base station with respect to the device-to-device communication. The base station also comprises a determining unit configured to determine, based on the device-to-device support status report and a measurement report received from the at least one user equipment, one or more candidate cells that support the device-to-device communication from the one or more cells of the at least one neighbor base station. The base station further comprises a transmitter configured to transmit, one or more handover requests respectively corresponding to the one or more candidate cells, to the neighbor base station for the handover of the at least one user equipment to one of the one or more candidate cells.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The embodiments of the present disclosure that are presented in the sense of examples and their advantages are explained in greater detail below with reference to the accompanying drawings, in which.

DETAILED DESCRIPTION OF EMBODIMENTS

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, a UE may be any suitable wireless terminal device, such as a mobile phone or a portable computer. In the present application document, reference is made to D2D enabled UEs, that is, UEs capable of performing the D2D communication. However, this should not be used to limit the present disclosure to any specific communication standards. Rather, the terms UE and communication terminal may be regarded as essentially synonymous, unless conflicting with the context. Likewise, the BS may be any suitable radio BS, such as a Node B or an eNode B, which may be changed in terminology with evolution of the wireless communication standards.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

In LTE Release-12 standard, the 3GPP only studies broadcast based direct link D2D communication without introducing any feedback between devices. One of the important issues for the D2D communication is related to resource allocation, i.e., to determine when and where the UEs should transmit and receive D2D data between each other. To this end, the 3GPP has defined two modes, i.e., mode-1 and mode-2 to allocate the radio resources to the UEs for the D2D transmission. In particular, the mode-1 is scheduling based resource allocation, which means that D2D transmission resource is scheduled by an evolved Node B ("eNB") on a per-UE basis and therefore the mode-1 transmission naturally only applies to RRC_CONNECTED mode UEs. In contrast with the mode-1, the mode-2 is autonomous D2D transmission under which all mode-2 UEs within a cell share a same transmission resource pool and they may transmit D2D data autonomously using the transmission resources from the transmission resource pool without having to be controlled or scheduled by the eNB. Therefore, mode-2 transmission is suitable for both RRC_CONNECTED and RRC_IDLE mode UEs. The mode-2 transmission is also tailored for the case of being out of coverage, in which case the transmission resource pool may be pre-configured to the UE.

Upon obtaining the D2D transmission resources under the mode-1 or mode-2 as discussed above, the UEs may perform D2D transmission and move between two eNBs, each of which may cover one or more cells, and are likely to experience a handover procedure from a serving eNB (also called a source eNB in the handover procedure) to a neighbor eNB (also called a target eNB in the handover procedure). In this case, UE mobility may confront some challenges for maintaining the D2D service continuity.

When the networks covered by a number of cells within a large area all support the D2D communication, it might be easier to achieve the D2D service continuity within this area regardless of which of cells the UE is about to enter into. However, there may be some cases where some cells may not support the D2D communication or have the D2D feature enabled. Such cells, for instance, may be: 1) some cells under pre-Release-12 eNBs which have not been upgraded to enable D2D feature; or 2) some cells on some frequency carriers of Release-12 eNB for which the operator may disable their D2D feature for some time periods for better cellular resource utilization and interference management. In these cases, if the UE with the ongoing D2D communication is handed over to a target cell having no support for the D2D communication or having the D2D feature disabled, then the D2D service would have to be aborted, resulting in bad service continuity, a poor user experience and a decrease in the communication efficiency.

To alleviate at least some problems or defects as mention above, the example embodiments of the present disclosure provide a number of methods and apparatuses which would be discussed in detail hereinafter with reference to respective accompanying drawings.

Figure 1:
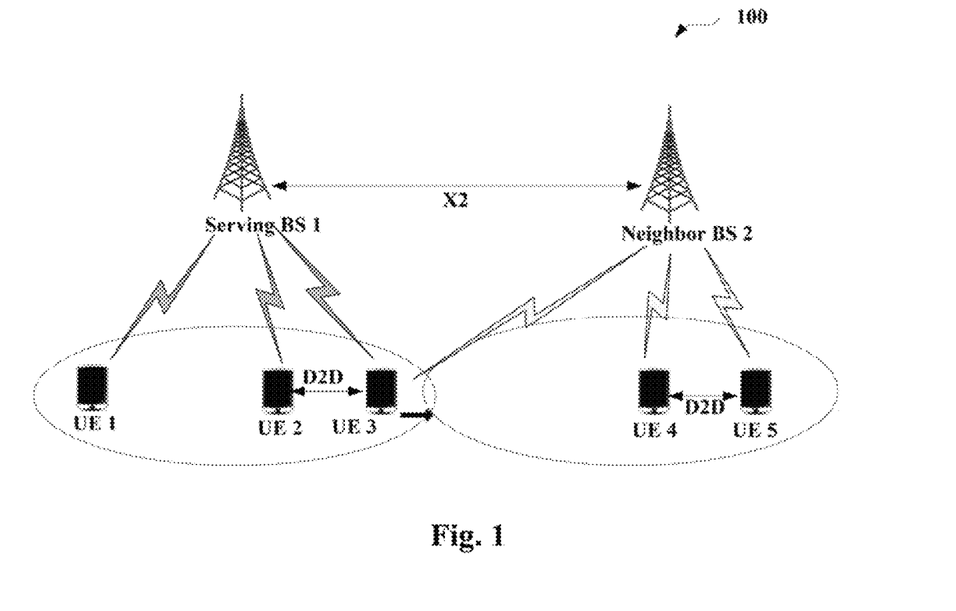
FIG. 1 illustrates an exemplary connectivity architecture in which example embodiments of the present disclosure may be practiced.

FIG. 1 illustrates an exemplary connectivity architecture 100 in which example embodiments of the present disclosure may be practiced. As exemplarily illustrated in FIG. 1, the architecture 100 comprises a serving BS 1 and a neighbor BS 2, which may be in connection with each other via an X2 interface as shown by a double-sided arrow. As shown, the serving BS 1 may communicate with each of UEs 1-3 in a cellular manner and the UEs 2 and 3 are assumed to be in ProSe D2D communication ("D2D communication" in short) since both are sufficiently close to each other and have available direct link for D2D communication. The similar occurs at the neighbor BS 2 and UEs 4 and 5 within its coverage area.

It should be noted that the number of the UEs and BSs as illustrated herein are only for exemplary purposes. There could be many UEs within the coverage area of the BS dependent on the coverage capability thereof and many BSs may be deployed in the architecture 100 as necessary. Therefore, a serving BS in the architecture 100 may be surrounded by several neighbor BSs for the potential handover procedures, although only one neighbor BS 2 is illustrated herein for easy discussion. Further, depending on different implementations, there may be additional entities in the architecture 100 which are not illustrated for simplification purposes. For example, a Mobility Management Entity ("MME")/a Serving-Gateway ("S-GW") may connect with the BSs (i.e., eNBs in the LTE system) so as to connect the UE to the Core Network ("CN") and forward the data between the BS and CN. Further, regarding the modifiers "serving" and "neighbor" before the acronym "BS," they are not changeless but may be flexibly changed based on the served UE. For example, the BS 1 is a serving BS and the BS 2 is a neighbor BS for the UEs 1, 2, and 3. However, the BS 1 is a neighbor BS and the BS 2 is a serving BS for the UEs 4 and 5. The following will discuss in general how the embodiments of the present disclosure would be implemented in the architecture 100.

To a better explanation of the embodiment of the present disclosure, it is assumed that the UE 3, which has the ongoing D2D communication with the UE 2 and is at the coverage edge of the serving BS 1, is about to move along a direction as shown by a solid arrow, from a cell provided by the serving BS 1 and depicted by an ellipse, into a new cell provided by the neighbor BS 2 and also depicted by an ellipse. Under this situation, in one embodiment, according to the pre-configurations made by the serving BS 1 via e.g., an RRC Connection Reconfiguration message, the UE 3 may measure the received downlink signal quality from the neighbor BS 2, which is, for example, characterized by the measurements of Reference Signal Received Power ("RSRP")/Reference Signal Received Quality ("RSRQ") or path loss. Then, a measurement report may be generated and transmitted by the UE 3 with the ongoing D2D communication to the serving BS 1 upon events triggering, such as the Event A3 and Event A4, which, as known to those skilled in the art, may be used to trigger a handover procedure. It should be noted that although the measurement report herein is merely related to the neighbor BS 2, it may be used to report the measurement results about one or more neighbor BSs that surround the serving BS and have the likelihood of being a target BS for the handover.

Upon receipt of the measurement report from the UE 3, the serving BS 1 may ascertain from the report which one or ones of cells of the neighbor BS 2 may be potential or candidate cells for the handover of the UE 3 thereto. As discussed before, to maintain the D2D service continuity, the cells that support the D2D communication are more preferable to those that do not support the D2D communication for the forthcoming handover procedure.

To identify these preferable cells, in one embodiment, if information regarding the support status of each of the one or more cells of the neighbor BS 2 with respect to the D2D communication is not available at the serving BS 1, then the serving BS 1 may request the UE 3 to transmit a D2D support status report regarding the previously-reported one or more cells in the measurement report. Upon obtaining the D2D support status report from the UE 3, the serving BS 1 may identify and prioritize those reported neighbor cells that support D2D communication for the handover preparation such that network signaling cost would be saved and D2D service continuity may be maintained. In another embodiment, the D2D support status report may be pre-exchanged by the serving BS 1 with the neighbor BS 2 via the X2 interface. In this case, by combining the D2D support status report and the measurement report transmitted by the UE 3, the serving BS 1 may also identify and prioritize those reported cells that support the D2D communication for the handover preparation.

Then, the serving BS 1 may send to the neighbor BS 2 one or more handover requests which correspond to one or more prioritized cells, respectively. Upon receipt of a handover acknowledgement message from the neighbor BS 2, the serving BS 1 may select one of the one or more candidate cells of the neighbor BS 2 as a target cell for the handover of the UE 3 thereto.

The foregoing has briefly discussed the utilization of the D2D support status report transmitted from the UE or the neighbor BS to select a cell that supports the D2D communication as a target cell for the handover of the UE with the ongoing D2D communication to the target cell. In this manner, the D2D service continuity could be maintained and signaling cost arising during the handover procedure could be reduced. The following would further describe the embodiments of the present disclosure with reference to the flow charts and block diagrams.

Figure 2:
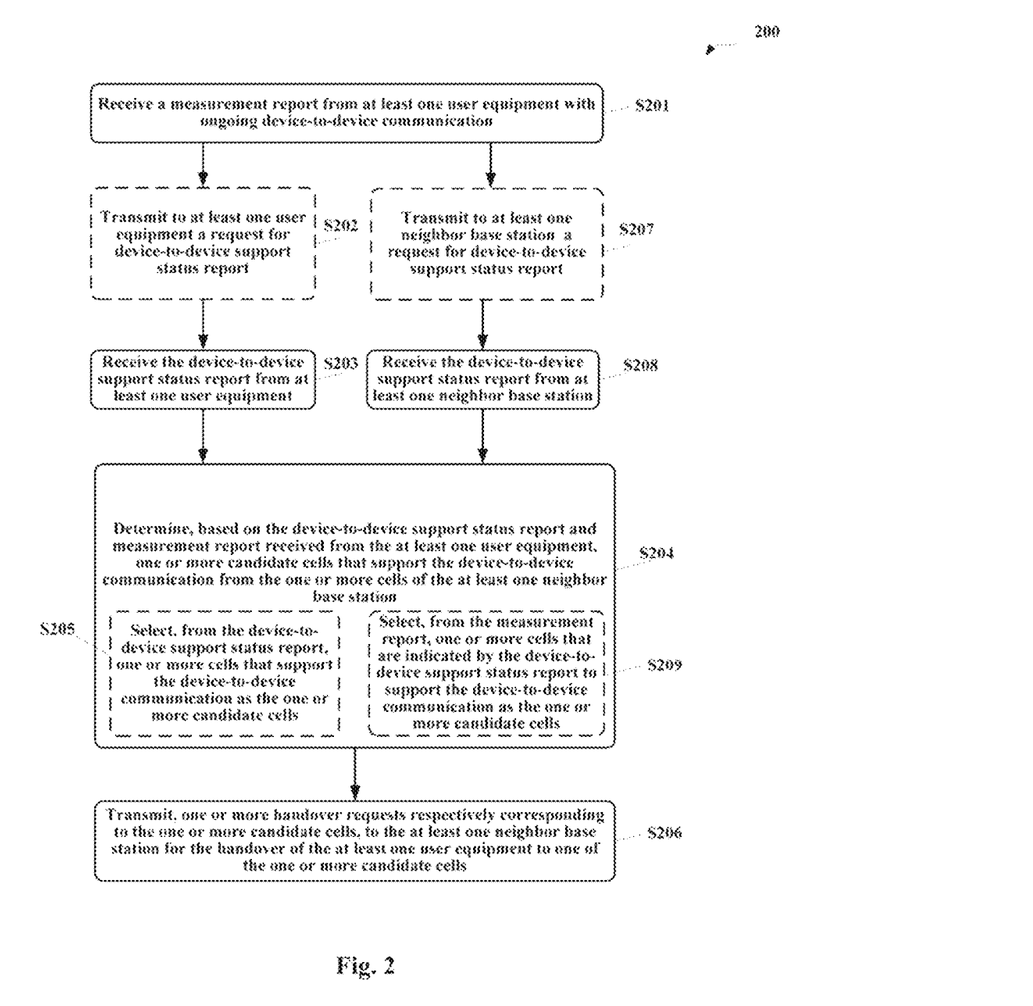
FIG. 2 is a flow chart schematically illustrating a method for performing a handover in the D2D communication according to an embodiment of the present disclosure.

FIG. 2 is a flow chart schematically illustrating a method 200 for performing a handover in the D2D communication according to an embodiment of the present disclosure. It should be noted that the method 200 may be carried out by a serving BS, e.g., the serving BS 1 as illustrated in FIG. 1 and include two solutions involving some variations, one of which proceeds with the flow comprising steps S201, S202, S203, S204, S205, and S206, and another of which proceeds with the flow comprising steps S201, S207, S208, S204, S209 and S206, wherein steps S201, S204 and S206 are common steps between the two flows. The following would first describe the flow comprising the steps S201, S202, S203, S204, S205, and S206.

As illustrated in FIG. 2, at step S201, the serving BS receives a measurement report from at least one UE with ongoing D2D communication, for example, the UE 3 as illustrated in FIG. 1. The measurement report may be an RSRP/RSRQ measurement report with respect to at least one neighbor cell under at least one neighbor BS, e.g., the neighbor BS 2 in FIG. 1. Measurement items which should be provided by the measurement report may be pre-configured by the serving BS via an RRC signaling message and indicates one or more cells of the at least one neighbor BS which are likely to act as a target cell for handing the UE over thereto. Further, the measurement report herein may be transmitted by the UE on a periodic basis or in an event-triggered manner.

Upon receipt of the measurement report, at step S202, the serving BS transmits to the UE at issue a request for a D2D support status report, which is required to indicate support status of each of one or more cells of the at least one neighbor BS with respect to the D2D communication. The one or more cells herein may be those cells indicated by the measurement report.

At step S203, the serving BS receives the D2D support status report from the UE. For each cell indicated by the measurement report, the D2D support status report may indicate whether it supports the D2D communication or not. This may be expressed in a bit manner, that is, a bit "1" indicates support for the D2D communication and a bit "0" indicates nonsupport for the D2D communication. The support status as to whether the cell of the at least one neighbor BS supports the D2D communication may be obtained by a signaling message broadcasted from each of the one or more cells of the at least one neighbor BS. The signaling message herein may be a ProSe System Information Block ("SIB") broadcasted from the one or more cells of the at least one neighbor BS and the ProSe SIB includes a bit field indicative of the support status of each cell with respect to the D2D communication or includes information regarding resource pools for the D2D communication within each cell. If the UE receives such resource pool information with respect to some cell, this means that this cell supports the D2D communication.

For example, at the UE side, after receiving the serving BS's request, it starts to read the broadcasted system information of the one or more cells of the at least one neighbor BS as indicated in the measurement report, i.e., in a targeted manner. If the UE successful searches the ProSe SIB from one cell of the at least one neighbor BS and the ProSe SIB broadcasts the D2D support bit of this cell as "True" or the ProSe SIB broadcasts the exact mode-2 resource pool, then the UE may inform the serving BS of this cell supporting the D2D communication via the D2D support status report. If the UE fails to search the ProSe SIB from one cell of the at least one neighbor BS or it finds the ProSe SIB but the ProSe SIB broadcasts the D2D support bit of the one cell as "False," then the UE may include this information into the D2D support status report and report it to the serving BS that this cell does not support the D2D communication.

At step S204, the serving BS determines, based on the D2D support status report and the measurement report received from the UE, one or more candidate cells that support the D2D communication from the one or more cells of the at least one neighbor BS. In one embodiment, the determination herein may be made by selecting, from the D2D support status report, one or more cells that support the D2D communication as the one or more candidate cells, such as shown at step S205. This direct selection made from the D2D support status report is due to the fact that the cells indicated by the D2D support status report are originated from those indicated by the measurement report, i.e., cells that support the D2D communication and are indicated by the measurement report.

Then, the flow proceeds to step S206, at which the serving BS transmits one or more handover requests respectively corresponding to the one or more candidate cells, to the at least one neighbor BS for the handover of the UE to one of the one or more candidate cells.

For example, as discussed before with reference to FIG. 1, the serving BS may prioritize the candidate cells in the D2D support status report that support the D2D communication based on some criterions, for example, the results of the RSRP/RSRQ. Then, the serving BS may transmit one or more handover requests, each of which may include the information with regard to the respective prioritized cell, to the at least one neighbor BS and wait for one or more handover acknowledgements from the at least one neighbor BS. Upon receipt of the handover acknowledgement, the serving BS may select one cell, for example, whose handover acknowledgement is first received, as a target cell for the handover of the UE thereto. After that, the serving BS may send a handover command to the UE, which then may initiate a random access procedure with one of the at least one neighbor BS associated with the selected target cell. When the UE at issue successfully connects to the neighbor BS, the handover procedure from the serving BS to the neighbor BS is completed. Then, the neighbor BS may inform the serving BS that the radio resources previously-allocated to the UE at issue may be released.

The foregoing has discussed some embodiments of the present disclosure with reference to one flow shown in FIG. 2. It should be noted that steps S202 and S205, which are depicted by dashed boxes, are optional steps for obtaining the D2D support status report and selecting the candidate cells. For example, the step S202 could be omitted in one embodiment if the reporting of the D2D support status report is made on a periodic basis or in an event-triggered manner. Further, the D2D support status report could also be obtained by other approaches, for example, it may be obtained directly from at least one neighbor BS, as will be discussed in detail in the following with reference to another flow in FIG. 2, i.e., the flow comprising the steps S201, S207, S208, S204, S209 and S206.

Similar to the above-mentioned, the flow begins with the step S201, at which the serving BS receives a measurement report from at least one UE with ongoing D2D communication, for example, the UE 3 as illustrated in FIG. 1. Then, at step S207, the serving BS transmits a request for the D2D support status report to the at least one neighbor BS, which would be its target BS in the subsequent handover. Similar to the request as made in step S202, the request herein may also be omitted in one embodiment. Then, at step S208, the serving BS receives the D2D support status report from the at least one neighbor BS. The support status report herein may include support status of each of one or more cells of the at least one neighbor BS with respect to the D2D communication and may take a form of a bit sequence in which each bit indicates whether the respective cell supports the D2D communication, for example, a bit "1" indicates support for the D2D communication and a bit "0" indicates nonsupport for the D2D communication, as discussed before. It should be noted that the order of the steps S201 and S208 as shown is only for an illustrative purpose and the step S208 may be performed prior to the step S201 in some embodiments.

After that, the flow proceeds to step S204, at which the serving BS determines, based on the D2D support status report and the measurement report received from the UE, one or more candidate cells that support the D2D communication from the one or more cells of the at least one neighbor BS. In one embodiment, the determination herein may be made by selecting, from the measurement report, one or more cells that are indicated by the D2D support status report to support the D2D communication as the one or more candidate cells, such as shown at step S209.

Then, the flow advances to step S206, at which the serving BS transmits one or more handover requests respectively corresponding to the one or more candidate cells, to the neighbor BS for the handover of the UE to one of the one or more candidate cells.

After that, as discussed previously, the serving BS may select one cell as the target cell based on the handover acknowledgements transmitted from the at least one neighbor BS and instruct the UE to access to the target cell. After the UE successfully connects to the target cell of the neighbor BS and the serving BS releases the radio resources previously allocated to the UE, the handover at issue is completed.

By virtue of the solutions and embodiments of the present disclosure as discussed above with reference to FIG. 2, the UEs with the ongoing D2D communication would not lose their D2D services when they are handed over from one cell in the serving BS to one cell in the neighbor BS since the cell selected in the neighbor BS supports the D2D services. Thereby, transmission efficiency of the D2D communication would be improved and D2D service continuity could be maintained, leading to a better user experience. Further, by employing the D2D support status report in conjunction with the measurement report for selecting the candidate cells, the signaling cost for transmission of handover commands could be saved.

It is to be understood that the above solutions and embodiments of the present disclosure are discussed from the serving BS's perspective. A person skilled in the art, based on the above discussion and teaching, is able to understand that the above discussion also discloses, from the UE's perspective, another method for performing a handover in the D2D communication. This method comprises transmitting a measurement report to a serving BS, wherein the measurement report indicates one or more cells of at least one neighbor BS. The method also comprises receiving a request for a D2D support status report from the serving BS. The method further comprises, responsive to the request, generating the D2D support status report based on a ProSe SIB broadcasted from the at least one neighbor BS, wherein the ProSe SIB includes a bit field indicative of the support status of each cell of the one or more cells with respect to the D2D communication or includes information regarding resource pools for the D2D communication within each cell. The method additionally comprises transmitting the D2D support status to the serving BS, wherein the D2D support status report indicates support status of each of the one or more cells of the at least one neighbor BS with respect to the D2D communication.

Figure 3:
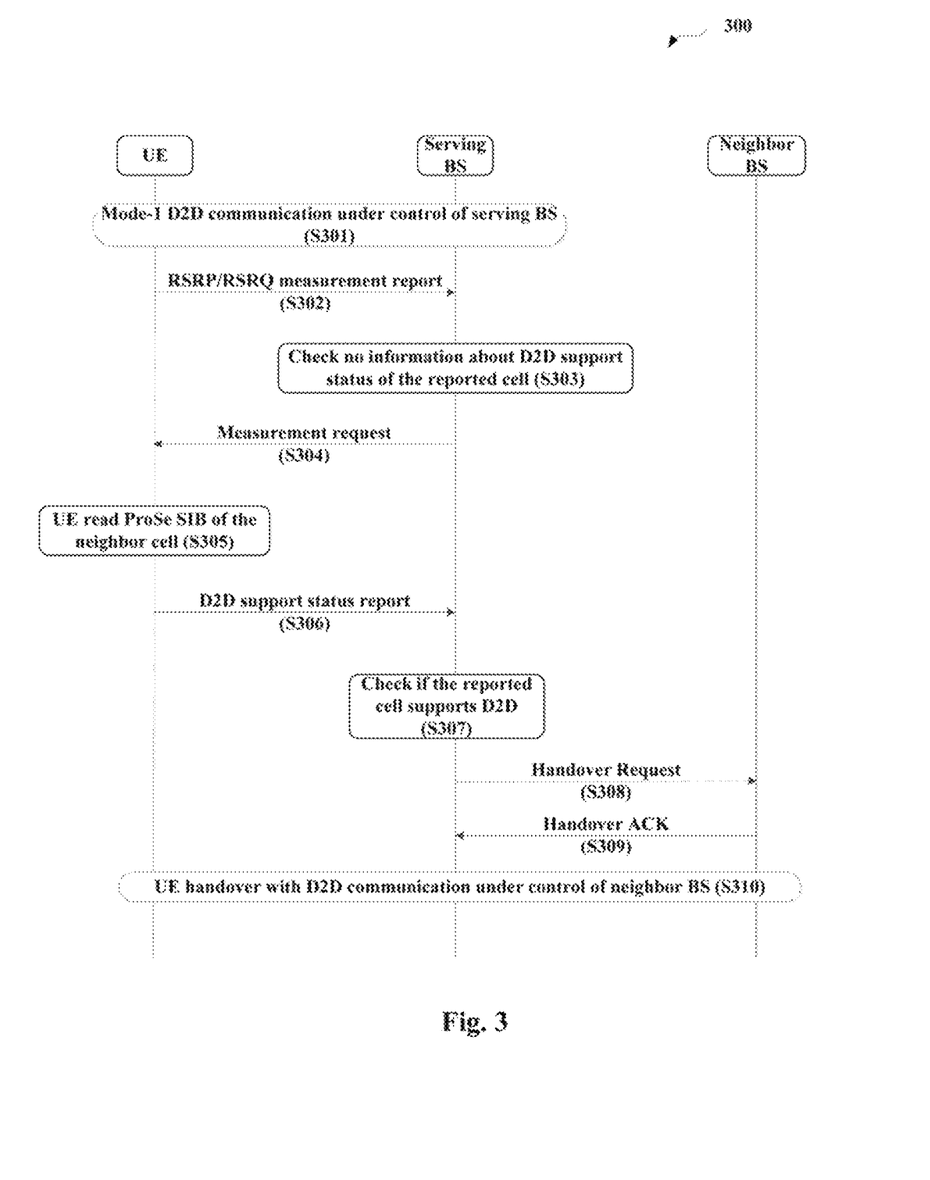
FIG. 3 is a messaging diagram schematically illustrating a process for performing a handover in the D2D communication according to an embodiment of the present disclosure.

FIG. 3 is a messaging diagram schematically illustrating a process 300 for performing a handover in the D2D communication according to an embodiment of the present disclosure. It may be seen from the depiction of FIG. 3 that the messaging flow illustrates more details of the flow comprising steps S201-S206 in FIG. 2. Therefore, the pertinent descriptions made with reference to FIG. 2 may be equally applied hereinafter.

At step S301, the UE, such as the UE 3 in FIG. 1, may conduct D2D communication with another UE (not shown) under the mode-1 as mentioned before, i.e., D2D transmission resources being scheduled by the serving BS. Then, over time, the UE sends a measurement report, e.g., an RSRP/RSRQ measurement report, to the serving BS for initiating a handover at step S302. Upon receipt of the measurement report from the UE, the serving BS checks, at step S303, if the D2D support status of the reported cells is available. If this is not the case, then the serving BS transmits to the UE a measurement request message via, e.g., an RRC signaling message, at step S304, requesting the UE to report about the D2D support status of the reported cells. As discussed before with reference to FIG. 2, the D2D support status indicates whether one cell supports the D2D communication or not.

Upon receiving the measurement request message, the UE reads the ProSe SIB of the at least one neighbor BS at step S305. As discussed before, the ProSe SIB is broadcasted from the at least one neighbor BS and may include a bit field indicative of the support status of each cell with respect to the D2D communication or include information regarding resource pools for the D2D communication within each cell. If the UE receives such resource pool information with respect to some cell, this means that the cell supports the D2D communication. After obtaining the D2D support status information, the UE includes this information, e.g., in a form of a bit sequence, in the D2D support status report and transmits the report to the serving BS at step S306.

Then, at step S307, the serving BS checks if the reported cells by the measurement report support the D2D communication based on the D2D support status report. In this manner, the serving BS may determine, based on the D2D support status report and the measurement report received from the UE, one or more candidate cells that support the D2D communication from the one or more cells of the neighbor BS, as illustrated at steps S204 and S205 in FIG. 2. At step S308, the serving BS transmits one or more handover requests, which may respectively correspond to one or more candidate cells, to the at least one neighbor BS, although only one handover request is illustrated for simplification purposes. In response, the at least one neighbor BS transmits, at step S309, one or more handover acknowledgements back to the serving BS, although only one handover acknowledgement is also illustrated for simplification purposes. Based on the received handover acknowledgement, the serving BS may select one of one or more candidate cells as a target cell and instruct the UE to connect to the target cell.

After that, at step S310, the UE with the ongoing D2D communication may successfully be handed over to one of the at least one neighbor BS associated with the target cell and proceed with the D2D communication under the control of this neighbor BS, which is acting as a serving BS now, without any D2D service discontinuity.

It should be noted that the details and exemplary subsequent operations after the serving BS receiving the handover acknowledgement have been discussed before with reference to FIG. 2, thus additional descriptions in this regard is omitted herein for the sake of brevity. Further, the steps and their order as illustrated in FIG. 3 are only for exemplary purposes and should not be used to limit the embodiments to this specific form.

Figure 4:
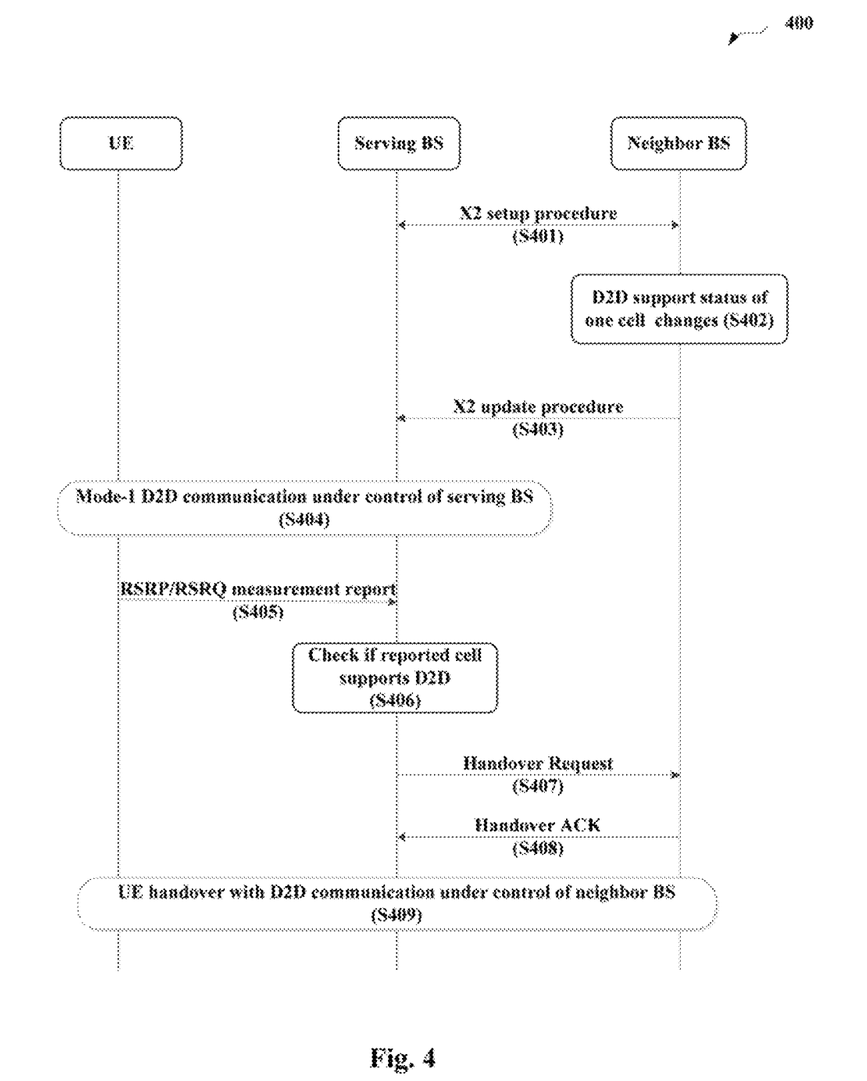
FIG. 4 is a messaging diagram schematically illustrating another process for performing a handover in the D2D communication according to another embodiment of the present disclosure.

FIG. 4 is a messaging diagram schematically illustrating another process 400 for performing a handover in the D2D communication according to another embodiment of the present disclosure. It may be seen from the depiction of FIG. 4 that the messaging flow illustrates more details of the flow comprising steps S201, S207, S208, S204, S209, and S206 in FIG. 2. Therefore, the pertinent descriptions made with reference to FIG. 2 may be equally applied hereinafter.

As illustrated in FIG. 4, at step S401, the serving BS and at least one the neighbor BS exchange D2D support status reports from each other via e.g., an X2 interface by e.g., an X2 setup procedure, or any other suitable interfaces, wherein each D2D support status report indicates support status of each of one or more cells of the corresponding BS with respect to the D2D communication. The D2D support status report herein may have the identical technical meaning to the ones mentioned with reference to FIGS. 1-3. The one or more cells herein may refer to all the cells that the at least one neighbor BS may provide for the handover. As an alternative, the one or more cells herein may refer to those cells that the neighbor BS intentionally selects for the handover according to resource utilization, traffic throughput, the number of users, operator's supervision, etc. Therefore, the cells reported by the D2D support status report may be different from or more or less than those that are informed by the measurement report as transmitted by the UE at a later step S405. Over time, the at least one neighbor BS may change D2D support status of one or more cells at step S402. Therefore, an X2 update procedure may be initiated at step S403, in which the at least one neighbor BS may inform the serving BS of the cells whose D2D support status are changed and should be accordingly updated at the serving BS.

Then, at step S404, which may be performed before, after, in parallel or concurrently with the steps S401-S403, the UE may conduct D2D communication with another UE (not shown) under the mode-1 as mentioned before, i.e., D2D transmission resources being scheduled by the serving BS. Then, over time, the UE sends a measurement report, e.g., an RSRP/RSRQ measurement report, to the serving BS for initiating a handover at step S405. Upon receipt of the measurement report from the UE, the serving BS checks, at step S406, whether the reported cells support the D2D communication. This checking could be done in the same manner as discussed in steps S204 and S209 in FIG. 2. Then, identical to the steps S308 and S309, the serving BS transmits one or more handover requests to the at least one neighbor BS at step S407 and receives one or more handover acknowledgments from the at least one neighbor BS at step S408, although only one handover acknowledgement is illustrated for simplification purposes. Based on the received handover acknowledgement, the serving BS may select one of one or more candidate cells as a target cell and instruct the UE to connect to the target cell.

After that, the UE with the ongoing D2D communication may successfully be handed over to one of the at least one neighbor BS associated with the target cell and proceed with the D2D communication under the control of this neighbor BS, which is acting as a serving BS now, without any D2D service discontinuity at step S409.

It should be noted that the order of steps S401-S403 is only exemplary and they may be performed subsequent to steps S404-S405 in some embodiments. Further, due to the fact that the D2D support status report may be exchanged beforehand via the X2 interface, it is unnecessary for the UE to transmit such a report via an air interface, thereby saving the radio resources and improving resource utilization.

Figure 5:
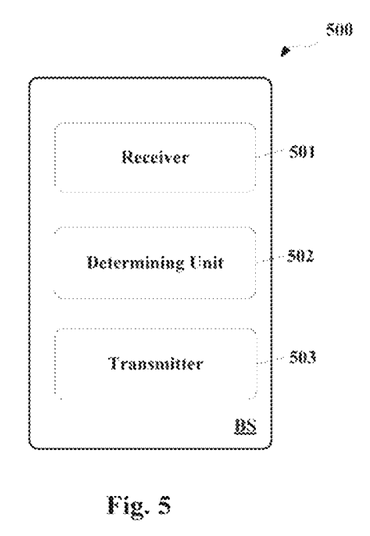
FIG. 5 is a simplified schematic block diagram illustrating a representative BS according to an embodiment of the present disclosure.

FIG. 5 is a simplified schematic block diagram illustrating a representative BS 500 according to an embodiment of the present disclosure. As illustrated in FIG. 5, the representative BS 500 includes a receiver 501, a determining unit 502 and a transmitter 503. The receiver 501 is configured to receive a D2D support status report from at least one UE with ongoing D2D communication or from at least one neighbor BS, wherein the D2D support status report indicates support status of each of one or more cells of the at least one neighbor BS with respect to the D2D communication. The determining unit 502 is configured to determine, based on the D2D support status report and a measurement report received from the at least one UE, one or more candidate cells that support the D2D communication from the one or more cells of the at least one neighbor BS. The transmitter 503 is configured to transmit, one or more handover requests respectively corresponding to the one or more candidate cells, to the neighbor BS for the handover of the at least one UE to one of the one or more candidate cells.

From the above descriptions and those made with respect to the FIGS. 1-4, it is to be understood that the representative BS 500 may implement the corresponding steps as discussed before in association with the method 200, the processes 300 and 400. For example, the BS 500 may receive the D2D support status report from the at least one neighbor BS via the interface setup procedure and may update this report via the interface update procedure. Additionally, although the receiver 501 and the transmitter 503 herein are illustrated in a separated manner, they may be combined into a single entity, such as a transceiver. Further, the determining unit herein may be implemented in software, hardware or some combination thereof based on different technical implementations.

Figure 6:
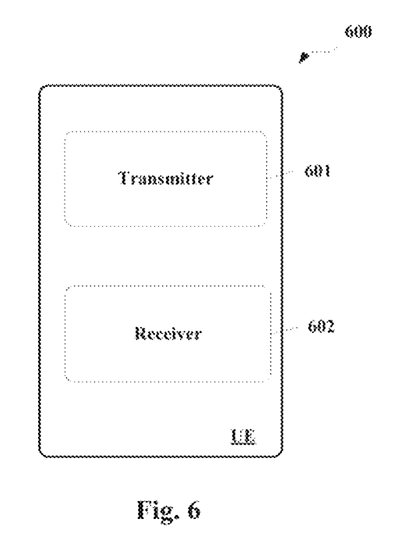
FIG. 6 is a simplified schematic block diagram illustrating a representative UE according to another embodiment of the present disclosure.

FIG. 6 is a simplified schematic block diagram illustrating a representative UE 600 according to another embodiment of the present disclosure. As illustrated in FIG. 6, the representative UE 600 includes a transmitter 601 and a receiver 602. The transmitter 601 is configured to transmit a measurement report to a serving BS, wherein the measurement report indicates one or more cells of at least one neighbor BS. The receiver 602 is configured to receive a request for a D2D support status report from the serving BS. The transmitter 601 herein is further configured to, in response to the request, transmit the D2D support status to the serving BS, wherein the D2D support status report indicates support status of each of the one or more cells of the at least one neighbor BS with respect to the D2D communication.

From the above descriptions and those made with respect to the FIGS. 1-4, it is to be understood that the representative UE 600 may implement the corresponding steps as discussed before in association with the method 200, the processes 300 and 400, thereby cooperating with the serving BS and the neighbor BS to complete the handover in the D2D communication in an efficient manner without any D2D service discontinuity. Additionally, although the transmitter 601 and the receiver 602 herein are illustrated in a separated manner, they may be combined into a single entity, such as a transceiver.

Figure 7:
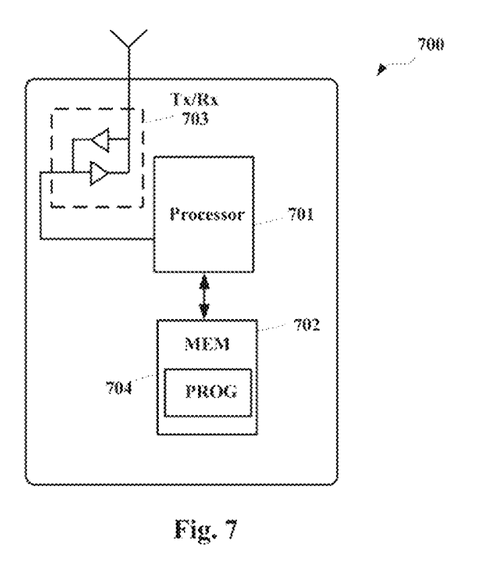
FIG. 7 is a simplified schematic block diagrams illustrating another representative apparatus, which may be embodied as a UE or BS according to an embodiment of the present disclosure.

FIG. 7 is a simplified schematic block diagram illustrating a representative apparatus 700, which may be embodied as a UE or BS (the serving BS or the neighbor BS as discussed before) according to an embodiment of the present disclosure. As illustrated in FIG. 7, the apparatus 700 includes at least one processor 701, such as a data processor, at least one memory (MEM) 702 coupled to the processor 701, and a suitable RF transmitter TX and receiver RX 703 coupled to the processor 701. The MEM 702 stores a program (PROG) 704. The TX/RX 703 is for bidirectional wireless communications, for example, it may function in a same manner as the receiver 501, transmitter 503, the transmitter 601, and the receiver 602 as respectively illustrated in FIGS. 5 and 6. Note that the TX/RX 703 has at least one antenna to facilitate communication, though in practice the apparatus 700 will typically have several for e.g., the Multiple Input Multiple Output ("MIMO") communication.

The PROG 704 is assumed to include instructions that, when executed by the processor 701, enable the apparatus 700 to operate in accordance with the exemplary embodiments of the present disclosure, as discussed herein with the methods 200, the processes 300 and 400. For example, the apparatus 700 may be embodied as a serving BS or a neighbor BS or a part thereof to carry out the corresponding steps directed thereto as discussed in the method 200, the processes 300 and 400. Likewise, the apparatus 700 may also be embodied as a UE with the ongoing D2D communication or a part thereof to carry out the method 200 and the processes 300 and 400, according to embodiments of the present disclosure.

In general, the embodiments of the present disclosure may be implemented by computer software executable by at least one processor 701 of the apparatus 700, or by hardware, or by a combination of software and hardware.

The MEM 702 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 700, there may be several physically distinct memory units in the apparatus 700. The processor 701 may be of any type suitable to the local technical environment, and may include one or more of general purpose computers, special purpose computers, microprocessors, digital signal processors (DSPs) and processors based on multicore processor architecture, as non-limiting examples. The apparatus 700 may have multiple processors, such as for example an application specific integrated circuit chip that is slaved in time to a clock which synchronizes the main processor.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, the BS according to the example embodiments of the present disclosure may include means for receiving a D21 support status report from at least one UE with ongoing D2D communication or from at least one neighbor BS, wherein the D2D support status report indicates support status of each of one or more cells of the at least one neighbor BS with respect to the D2D communication. The BS may also include means for determining, based on the D2D support status report and a measurement report received from the at least one UE, one or more candidate cells that support the D2D communication from the one or more cells of the at least one neighbor BS. The BS may further include means for transmitting, one or more handover requests respectively corresponding to the one or more candidate cells, to the neighbor BS for the handover of the at least one UE to one of the one or more candidate cells. Likewise, the UE according to example embodiment of the present disclosure may include means for transmitting a measurement report to a serving BS, wherein the measurement report indicates one or more cells of at least one neighbor BS. The UE may also include means for receiving a request for a D2D support status report from the serving BS. Further, the means for transmitting may be further configured to, in response to the request, transmit the D2D support status to the serving BS, wherein the D2D support status report indicates support status of each of the one or more cells of the at least one neighbor BS with respect to the D2D communication.

In addition, the example embodiments of the present disclosure may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art. For example, the example embodiments of the present disclosure may be implemented in a non-transitory computer readable medium having program code stored thereon, the program code configured to direct an apparatus (e.g., a UE or a BS) for performing a handover in device-to-device communication, when executed, to carry out the steps as illustrated in FIGS. 1-4.

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A base station, comprising:
a transmitter and a receiver; and
at least one processor coupled to the transmitter and the receiver, the at least one processor comprising memory including at least one program that, when executed, causes the at least one processor to control the base station to:
determine, based at least in part on a measurement report received from at least one user equipment associated with device-to-device communication, one or more candidate cells that support the device-to-device communication from two or more cells of at least one neighbor base station, wherein at least one cell of the two or more cells of the at least one neighbor base station does not support the device-to-device communication; and
transmit, from the transmitter, one or more handover requests respectively corresponding to the one or more candidate cells, to the neighbor base station for handover of the at least one user equipment associated with the device-to-device communication to one of the one or more candidate cells.

2. The base station as recited in claim 1, wherein execution of the at least one program further causes the at least one processor to control the base station to receive information about the one or more candidate cells from the at least one user equipment associated with the device-to-device communication.

3. The base station according to claim 2, wherein the execution of the at least one program further causes the at least one processor to control the base station to transmit a request to the at least one user equipment for the information.

4. The base station according to claim 1, wherein execution of the at least one program further causes the at least one processor to control the base station to receive information about the one or more candidate cells from the at least one neighbor base station.

5. The base station according to claim 4, wherein the execution of the at least one program further causes the at least one processor to control the base station to initiate an interface setup procedure for receiving the information.

6. The base station according to claim 5, wherein the execution of the at least one program further causes the at least one processor to control the base station to initiate the interface setup procedure for updating the information.

7. The base station according to claim 6, wherein the execution of the at least one program further causes the at least one processor to control the base station to receive additional information on changes in whether or not any of the two or more cells of the at least one neighbor base station supports the device-to-device communication.

8. The base station according to claim 5, wherein the interface setup procedure is an X2 interface.

9. A method for performing a handover of at least one user equipment associated with a device-to-device communication, comprising:

determining, based at least in part on a measurement report received from the at least one user equipment, one or more candidate cells that support device-to-device communication from two or more cells of at least one neighbor base station, wherein at least one cell of the two or more cells of the at least one neighbor base station does not support the device-to-device communication; and transmitting from a serving base station, one or more handover requests respectively corresponding to the one or more candidate cells, to the neighbor base station for handover of the at least one user equipment associated with the device-to-device communication to one of the one or more candidate cells.

10. The method according to claim 9, further comprising receiving information about the one or more candidate cells from the at least one user equipment associated with the device-to-device communication.

11. The method according to claim 10, further comprising transmitting a request to the at least one user equipment for the information.

12. The method according to claim 9, further comprising receiving information about the one or more candidate cells from the at least one neighbor base station.

13. The method according to claim 12, further comprising initiating an interface setup procedure for receiving the information.

14. The method according to claim 13, wherein the initiating the interface setup procedure comprises initiating the interface setup procedure for updating the information.

15. The method according to claim 14, further comprising receiving additional information on changes in whether or not any of the two or more cells of the at least one neighbor base station supports the device-to-device communication.

* * * * *